United States Patent [19]
Hara et al.

[11] Patent Number: 5,684,350
[45] Date of Patent: Nov. 4, 1997

[54] ELECTROMAGNETIC ROTARY ACTUATOR AND HOUSING FOR ELECTRONIC DEVICES

[75] Inventors: Yasuhiko Hara; Fumihiko Tsuji, both of Tokyo; Katsuhito Miyoshi, Nagoya, all of Japan

[73] Assignees: Kayaba Kogyo Kabushiki Kaisha, Tokyo; Toukai Denshi Kogyo Kabushiki Kaisha, Aichi, both of Japan

[21] Appl. No.: 521,163

[22] Filed: Aug. 30, 1995

[30] Foreign Application Priority Data

Sep. 8, 1994 [JP] Japan ................. 6-214829
Feb. 20, 1995 [JP] Japan ................. 7-030771

[51] Int. Cl.$^6$ .............. H02K 5/00; H02K 33/00; H02K 7/10; H02K 49/00
[52] U.S. Cl. ................ 310/89; 310/36; 310/77; 310/93
[58] Field of Search ................ 310/76, 77, 254, 310/92, 93, 89, 36

[56] References Cited

U.S. PATENT DOCUMENTS

| | | | |
|---|---|---|---|
| 791,528 | 6/1905 | Young | 310/254 |
| 3,665,231 | 5/1972 | Wendler | 310/77 |
| 3,760,909 | 9/1973 | Grove | 188/138 |
| 4,142,610 | 3/1979 | Alexander et al. | 188/71.9 |
| 4,442,392 | 4/1984 | Hore | 318/696 |
| 4,628,752 | 12/1986 | Paxton et al. | 74/411.5 |
| 4,647,801 | 3/1987 | Swartwout | 310/41 |
| 4,890,027 | 12/1989 | Bohner et al. | 310/328 |
| 4,910,422 | 3/1990 | Brinkman et al. | 310/77 |
| 4,947,069 | 8/1990 | Grant | 310/77 |
| 5,034,670 | 7/1991 | Tominaga | 318/436 |
| 5,057,728 | 10/1991 | Dammeyer et al. | 310/77 |
| 5,189,354 | 2/1993 | Tominaga et al. | 318/671 |
| 5,389,862 | 2/1995 | Tominaga | 318/254 |
| 5,413,566 | 5/1995 | Sevrain et al. | 604/248 |

*Primary Examiner*—Steven L. Stephan
*Assistant Examiner*—Michael Wallace, Jr.
*Attorney, Agent, or Firm*—Jordan and Hamburg

[57] ABSTRACT

A ring rotor wherein two magnets of different polarities are disposed in an annular fashion, is supported free to rotate on a base. Two stator coils fixed on the base face these magnets inside of this rotor. Also provided are a switch fixed for selectively energizing these coils, and a mechanism for holding the ring rotor in a predetermined rotation position. Due to the use of magnets for the rotor, brushes are unnecessary, and the ring rotor can be held in a stop position by the holding mechanism.

Throughholes connecting the inside of the housing and the outside of the housing base are provided in a boss projecting from the base towards the inside of the housing. Grooves are formed from the opening position of the throughhole in the base to the side walls of the housing. Bends are provided in these grooves. Leads running from outside into the housing are guided inside the housing via these grooves and throughholes. Leads are fixed by filling the grooves and throughholes with a filler. External forces acting on the leads are supported by these bends and the fixed force of the filler, thereby preventing loads from affecting wiring connections inside the housing.

5 Claims, 14 Drawing Sheets

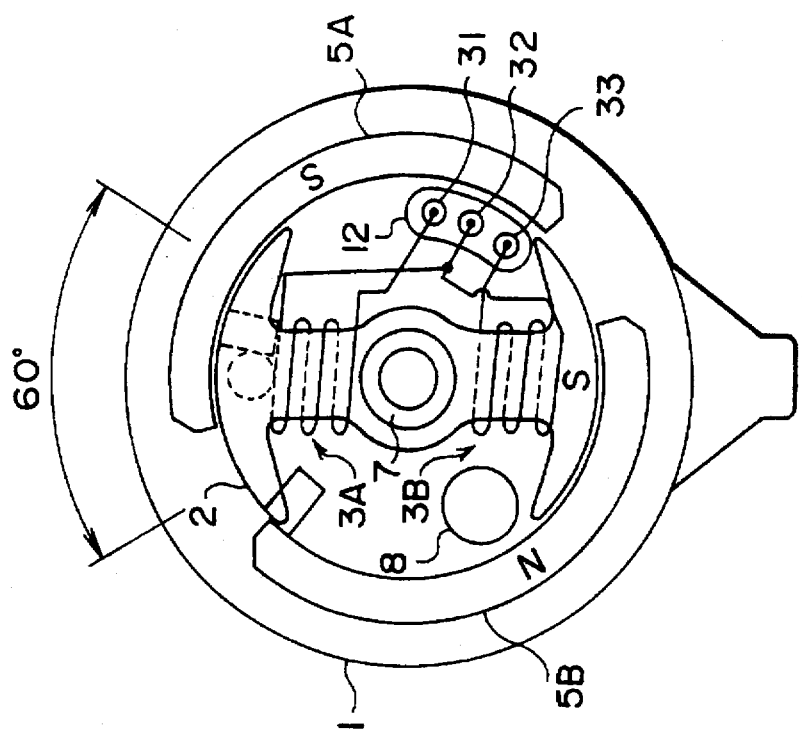
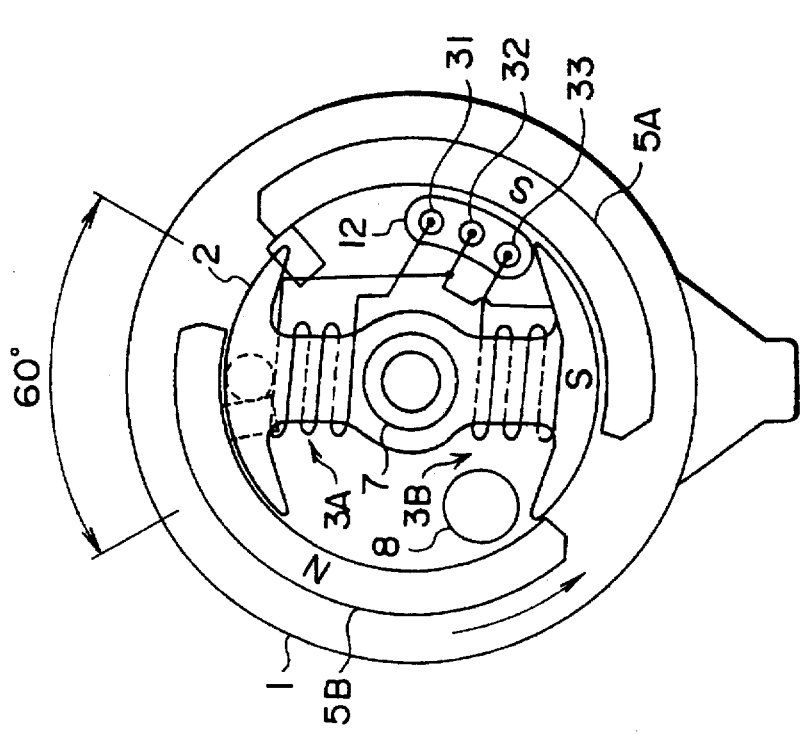
FIG. 3A
FIG. 3B

ELECTROMAGNETIC ROTARY ACTUATOR AND HOUSING FOR ELECTRONIC DEVICES

FIELD OF THE INVENTION

This invention relates to an electromagnetic rotary actuator that performs a rotation when a coil is energized.

This invention also relates to the structure of a housing for accommodating an electronic device such as an electromagnetic actuator.

BACKGROUND OF THE INVENTION

In several electronically controlled suspension systems for automobiles, there is provided a hydraulic damper that changes a damping force according to an input signal. In these systems, a plurality of orifices having different flow cross-sections are arranged in parallel in an oil flowpath in the damper, and the orifice used is changed over according to the rotation angle of a control rod inserted in the damper. The control rod is connected to a rotary type electromagnetic actuator, and it rotates between a plurality of rotation angles according to signals output from a controller.

An electromagnetic actuator of this type is disclosed for example in Tokkai Hei 2-280653 published by the Japanese Patent Office in 1990. In this actuator, in contrast to the conventional structure wherein current is supplied by brushes, a rotor comprising magnets rotates when a fixed stator is energized by coils. The rotor comprises four magnets arranged with alternating N and S poles, and the stator comprises six coils arranged at equiangular intervals surrounding the rotor.

The coils in this actuator are associated with the stator, and as no current is supplied to rotating parts, there is no need for brushes. This design has a desirable effect on the lifetime of the actuator.

However, this electromagnetic actuator comprises a large number of coils and a complex operation mechanism, so the cost of manufacturing it is high and it Is difficult to make it compact.

Further, as the rotor is held in a predetermined rotation position by magnetism, the retaining force is lost when the current is interrupted and the rotor may move by itself.

Insofar as concerns the housing used to house electrical devices in automobiles such as electromagnetic actuators, solenoids and sensors, cords, leads and wires are often made to project outwards from the side or edge. This wiring may be connected to electrical circuits in the chassis of the automobile via connectors. In the area leading to the inside of the housing, connections are made to circuit components of devices such as coils via terminals provided in the housing.

However, if the wiring or housing is under a load during vehicle assembly or repair, the load may affect terminal connections inside the housing so as to cause a break in the wiring. Such a break may also be caused when connections are repeatedly subjected to vibration.

Moreover if wiring and circuit components of devices are connected via relays such as terminals, space must be reserved for these relays in the housing, and it is thus more difficult to make the housing compact.

SUMMARY OF THE INVENTION

It is therefore an object of this invention to simplify the construction of an electromagnetic rotary actuator and its operation mechanism.

It is a further object of this invention to make sure the rotor stops moving after current is shut off.

It is still a further object of this invention to optimize the layout of the wiring inside the housing of electrical devices such as electromagnetic actuators.

It Is still a further object of this invention to make the housing more compact.

In order to achieve the above objects, this invention provides an electromagnetic actuator comprising a ring rotor having two magnets of different polarity disposed on an inner circumferential surface of the rotor, a base for supporting the ring rotor such that the rotor is free to rotate, two stator coils fixed on the base opposite the magnets on the inner side of the ring rotor, a switching mechanism for selectively energizing the stator coils, and a mechanism for holding the ring rotor in a predetermined rotation position.

It is preferable that the holding mechanism comprises a plurality of engaging holes formed at predetermined positions on the ring rotor, a positioning member engaging detachably with the engaging holes, and a member for pushing the positioning member toward the ring rotor.

It is also preferable that the actuator further comprises a stopper for limiting the rotation of the ring rotor beyond the predetermined rotation position.

It is also preferable that the actuator further comprises a timer interposed in series with the switching mechanism, and which shuts off current to the coils at a predetermined time after energization begins.

This invention also provides a housing for housing an electrical device in a space defined by a base and side walls in which an electrical lead is led to the device from outside the housing. The housing comprises a boss projecting into the housing from the base, a throughole passing through the boss and opening to the outside of the housing, a groove of predetermined depth formed on the base external surface of the housing, and extending from the opening of the throughole in the base to one of the side walls, and a bend provided at a predetermined position in the groove.

It is preferable that the lead is fixed on the inside of the grooves by a filler.

It is also preferable that the lead is comprises a core covered by a sheath, and the throughholes comprise a first throughole opening into the housing having a diameter larger than a diameter of the core and smaller than an outer diameter of the sheath, and a second throughole connected to the first throughole and opening outside the housing having a diameter larger than the outer diameter of the sheath.

It is also preferable that the housing further comprises a clamp disposed on the side walls in the vicinity of the groove for holding the lead.

The details as well as other features and advantages of this invention are set forth in the remainder of the specification and are shown in the accompanying drawings.

BRIEF DESCRIPTION OF THE DRAWINGS

FIG. 3 is a set of schematic horizontal sectional views of the electromagnetic rotary actuator showing rotation positions of a ring rotor according to this invention.

DESCRIPTION OF THE PREFERRED EMBODIMENTS

Figure 1:
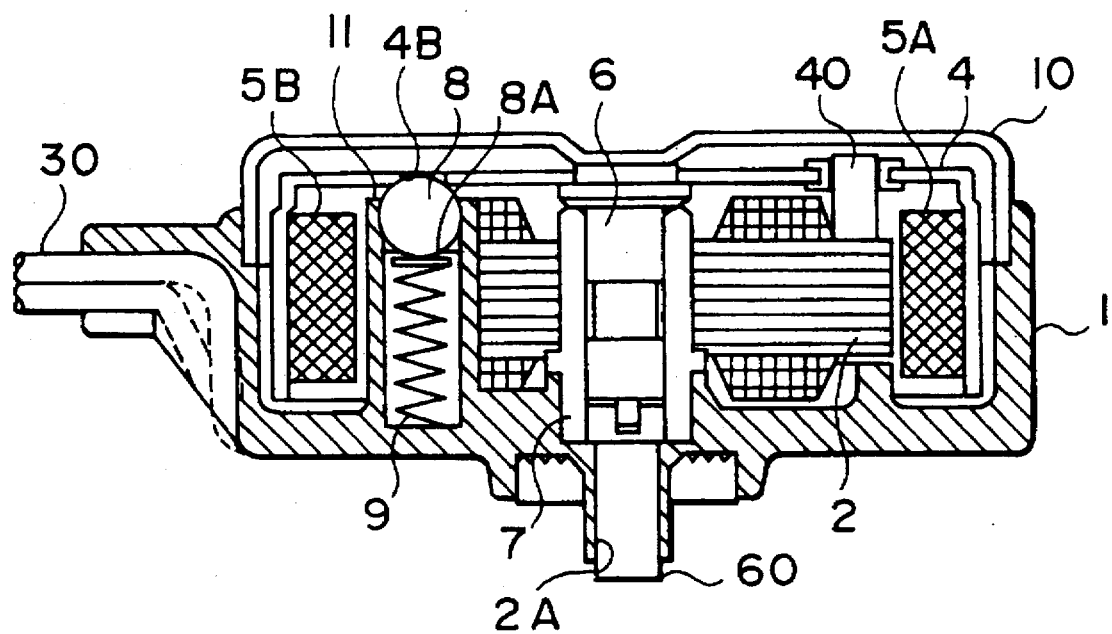
FIG. 1 is a vertical sectional view of an electromagnetic rotary actuator according to this invention.

Referring to FIG. 1 of the drawings, an electromagnetic actuator is provided with a housing 1 having a circular cross-section and a ring rotor 4 free to rotate inside the housing 1.

As in the prior art, this electromagnetic actuator serves to rotate a control rod in a hydraulic damper of an automobile, and forms a part of an electronically controlled suspension system.

The ring rotor 4 has a cylindrical shape with an open end, and it is housed in the housing 1 such that its open end faces the base of the housing 1.

The housing 1 is enclosed by a cover 10.

A throughhole 2A is formed in the center of the housing 1. A joint 60 connected to the aforesaid control rod passes through this throughhole 2A from outside the housing 1 such that the joint is free to rotate. The tip of the joint 60 penetrates a bearing 7 pressed into the housing 1 and is joined inside the bearing 7 to a rotor shaft 6 fixed to the center of the ring rotor 4.

The rotor shaft 6 is supported by the bearing 7 so as to permit free rotation of the ring rotor 4 relative to the housing 1.

Figure 2:
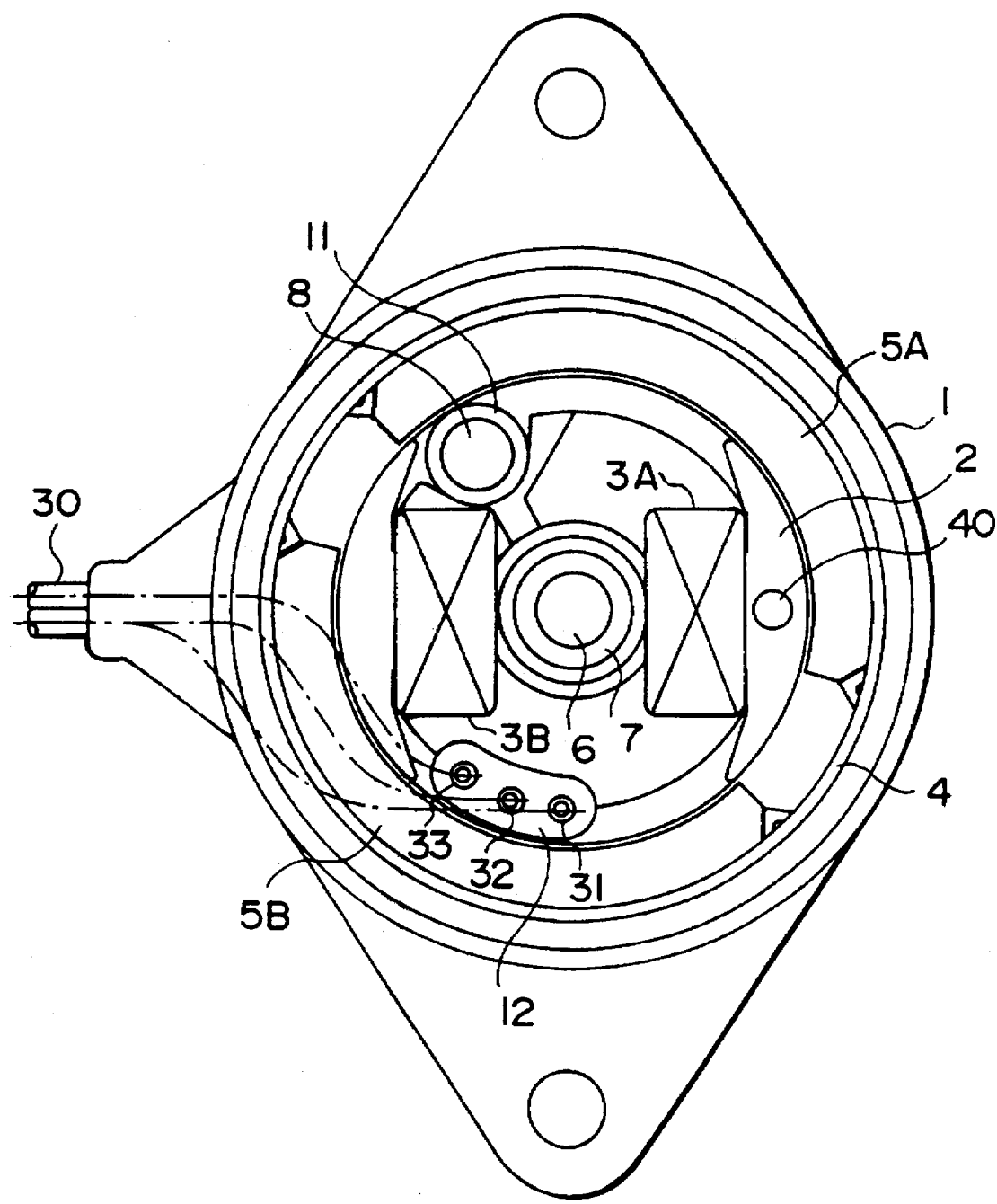
FIG. 2 is a horizontal sectional view of the electromagnetic rotary actuator.

Two magnets 5A, 5B are fixed facing each other on the inner circumference of the ring rotor 4 as shown in FIG. 2. The magnets 5A, 5B have an arc-shaped horizontal cross-section, the inner circumferences of the magnets 5A and 5B being magnetized as S and N poles respectively.

Two cores 2 are fixed on the inner side of the magnets 5A, 5B in the housing 1. The cores 2 are pressed over the outer circumference of the bearing 7, and are disposed symmetrically on either side of the bearing 7. Coils 3A, 3B are wound on the core 2.

A boss 12 for guiding leads 31–33 that energize these coils project upwards from the base of the housing. The leads 31–33 pass through the boss 12, are led out together from the side of the housing 1 by a harness 30, and are connected to a control circuit described hereinafter.

The leads 31–33 supply power to the coils 3A, 3B respectively, a lead 32 being an earth wire. The coils 3A, 3B are wound in such a direction that the end face of the core adjacent to ring rotor 4 around which an energized coil is wound, becomes magnetized as a S pole whichever coil is energized.

A holder 11 on the base of the housing 1 projects towards the ring rotor 4 in such a position that it does not interfere with the coils 3A, 3B and boss 12. The holder 11 is formed in the shape of an open-ended cylinder, this holder 11 housing a detent ball 8 that acts as a positioning member of the ring rotor 4 and a spring 9 that pushes this ball 8 toward the ring rotor 4 via a retainer 8A.

Figure 4:
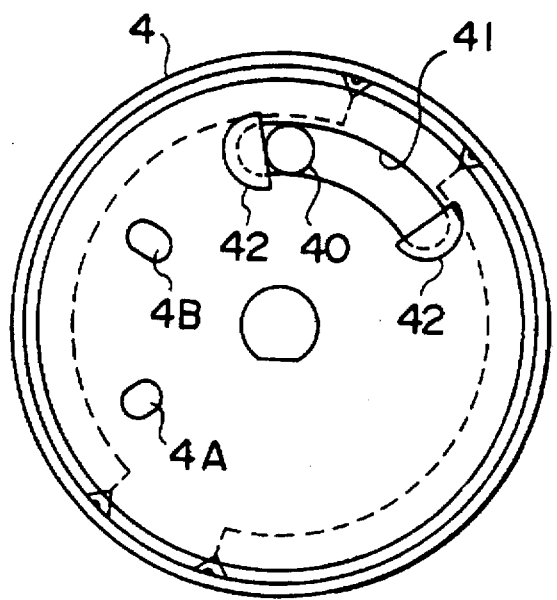
FIG. 4 is a plan view of a retaining mechanism of the ring rotor according to this invention.

Engaging holes 4A, 4B that engage detachably with the ball 8, are formed at a 60° angular interval on the base of the ring rotor 4 as shown in FIG. 4.

When the ring rotor 4 rotates, the ball 8 pushed by the spring 9 rolls over in contact with the base of the rotor, and enters an engaging hole 4A(4B) at a predetermined rotation position. A resistance opposing the rotation of the ring rotor 4 from this position is then produced by the ball 8 and hole 4A(4B) according to the elastic force of the spring 9 so as to fix the position of the ring rotor 4 and hold it.

The engaging position of the ball 8 and hole 4A(4B) corresponds to a preset rotation position of the control rod in the hydraulic damper.

Figure 5:
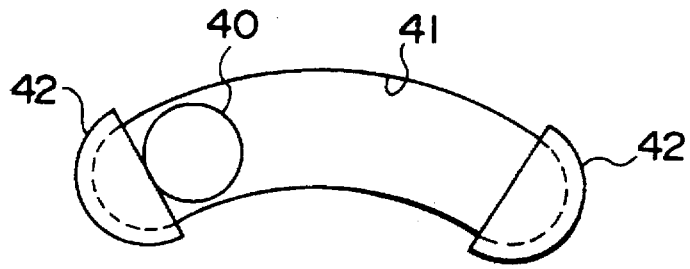
FIG. 5 is an enlarged plan view of a part of FIG. 4.
Figure 6:
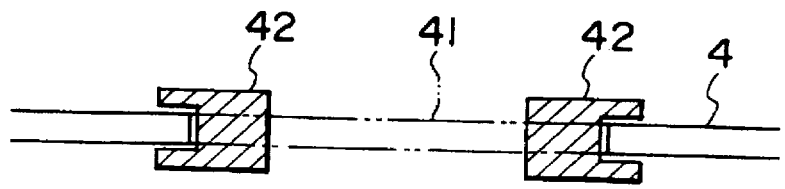
FIG. 6 is a vertical sectional view of an oblong hole and a damper according to this invention.

A stopper pin 40 projects towards the base of the ring rotor 4 outside the coil 3A of the core 2. The stopper pin 40 passes through an arc-shaped oblong hole 41 formed in the base of the ring rotor 4 as shown in FIGS. 4–6. The length of the hole 41 corresponds to the angular interval of the two holes 4A, 4B, rubber dampers 42 being fitted at its two ends.

Figure 7:
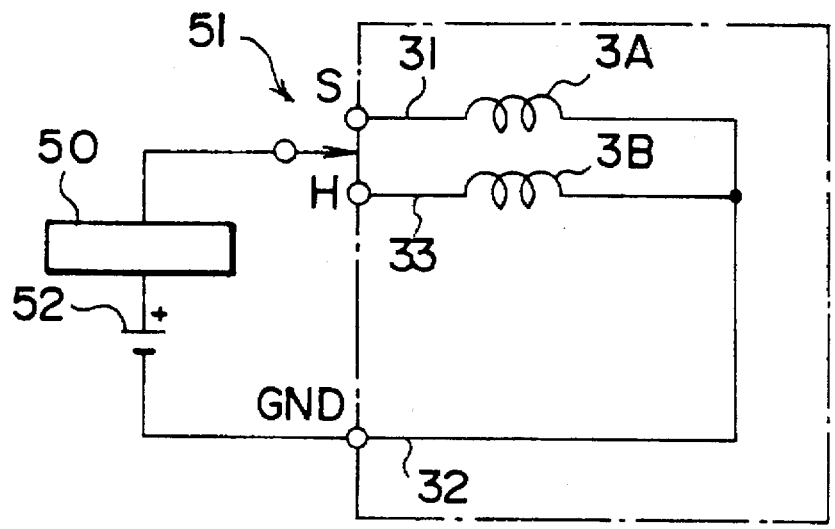
FIG. 7 is a control circuit diagram of coils according to this invention.

Passage of current through the coils 3A, 3B via the leads 31–33 is controlled by a control circuit shown in FIG. 7. Current from a DC power supply 52 is led to a switch 51 via a timer 50, and the switch 51 supplies this current selectively to either a contact connected to the coil 3A via the lead 31, or a contact connected to the coil 3B via the lead 33. The current supply time is controlled by the timer 50. The timer 50 is reset when the switch 51 is switched over, and supply of current to the switch 51 is shut off when a fixed time has elapsed after the switch-over.

The switch-over of the switch 51 is performed for example according to a command from a controller in the electronically controlled suspension system.

The contacts S and H in FIG. 7 correspond to soft and hard damping forces. FIG. 3(a) corresponds to the state when the switch 51 is set to S, and FIG. 3(b) corresponds to the state when the switch 51 is set to H.

When the switch 51 is set to the contact H, the coil 3B is energized via the lead 33, and the end of the core 2 that passes through the coil 3B is magnetized as a S pole as shown in FIG. 3(a). The inner circumference of the magnet 5A facing the end of the core 2 is also magnetized as a S pole, hence, due to the repulsion between these S poles and the attraction between the S pole of the core 2 and the N pole of the inner circumference of the magnet 5B, the ring rotor 4 rotates to the position shown in FIG. 3(b). Then, the magnet 5B of which the inner circumference is magnetized as a N pole faces the end of the core 2 which is a S pole and the ball 8 enters the hole 4B, so the rotation of the ring rotor 4 stops.

Even if the ring rotor 4 would overshoot the stop position due to inertia, the stopper pin 40 comes into contact with the damper 42 at the end of the oblong hole 41, so rotation of the rotor 4 beyond this position is prevented. The ring rotor 4 is therefore brought to rest accurately in the predetermined position. The control rod joined to the rotor 4 via the joint 60 also rotates accurately to the position wherein a hard damping force is generated.

After the ring rotor 4 has stopped rotating, when a set time has elapsed, the timer 50 shuts off current to the switch 51, hence there is no need for concern that the coil 3B will overheat due to continued energization. Subsequently, the ring rotor 4 is held in the stop position by a retaining force due to the engaging of the ball 8 in the hole 4A and by a anti-rotating force due to the contact of the stopper pin 40 and damper 42, until the switch 51 is again switched over. As power is used only to operate the actuator and not to hold it in position after operation, the actuator does not consume much power.

When the switch 51 is switched over to the contact S, the end of the core 2 passing through the coil 3A faces a S pole. The inner circumference of the magnet 5A facing this S pole is magnetized as a S pole, so due to the repulsion between these S poles and to the attraction between the S pole of the core 2 and the N pole on the inner circumference of the magnet 5B, the ring rotor 4 rotates from the state of FIG. 3(b) to the state of FIG. 3(a). The stopper pin 40 then comes into contact with the damper 42 at the opposite end of the oblong hole 41 and the ball 8 engages with the hole 4A, so the rotation of the ring rotor 4 stops and the rotor is held in its stop position. Due to this action, the control rod rotates to the position where a soft damping force is generated.

Hence, the ring rotor 4 rotates between two positions determined by the ball 8 and the engaging holes 4A, 4B according to the switching operation of the switch 51, and the control rod is rotated accurately between a position that sets a hard damping force and a position that sets a soft damping force.

In this actuator, the ring rotor 4 with fixed magnets 5A, 5B rotates, and the coils 3A, 3B that perform energization do not rotate. There is therefore no need to provide brushes to energize the coils, and there is no chance of faulty operation due to poor brush contacts. Also, the construction of the actuator is simpler insofar as there are no brushes.

As the point of action of the magnetic force rotating the ring rotor 4 is situated close to the outer circumference of the actuator, a sufficiently large rotation torque can be applied to the control rod.

Figure 8:
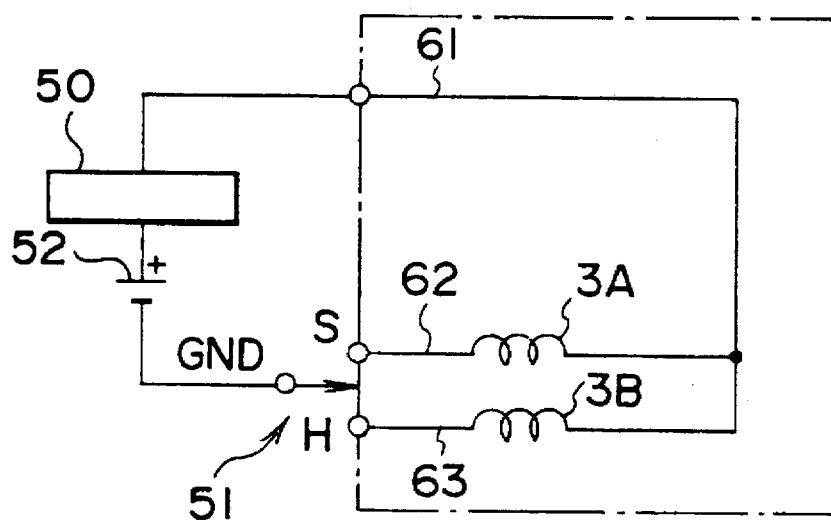
FIG. 8 is similar to FIG. 7, but showing a second embodiment of this invention.

FIGS. 8 and 9 show a second embodiment of this invention.

In this actuator, as shown by the control circuit of FIG. 8, the switch 51 is set to the minus side of the power supply 52 and the energization direction of the coils 3A, 3B is set to be opposite to that of the first embodiment.

Figure 9A:
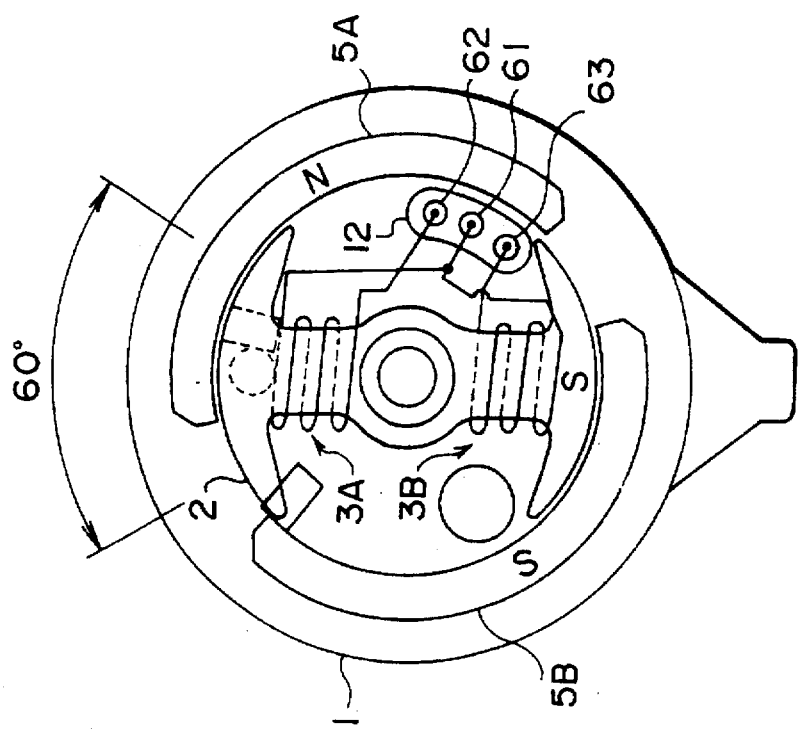
FIG. 9 is similar to FIG. 3, but also showing the second embodiment.

In this case, when the switch 51 is set to the contact S, a current flows in the coil 3A in an opposite direction to that of the first embodiment due to leads 61, 62, and the end of the core 2 passing through the coil 3A is magnetized as a N pole as shown in FIG. 9(a). As the inner circumference of the magnet 5A facing this N pole is also magnetized as a N pole, there is a repulsion between these poles and an attraction between the N pole of the end of the core 2 and the S pole of the inner circumference of the magnet 5B. The ring rotor 4 therefore rotates in the direction shown by the arrow in the diagram so as to reach the position of FIG. 9(b), and the control rod rotates to a hard damping force setting position.

Figure 9B:
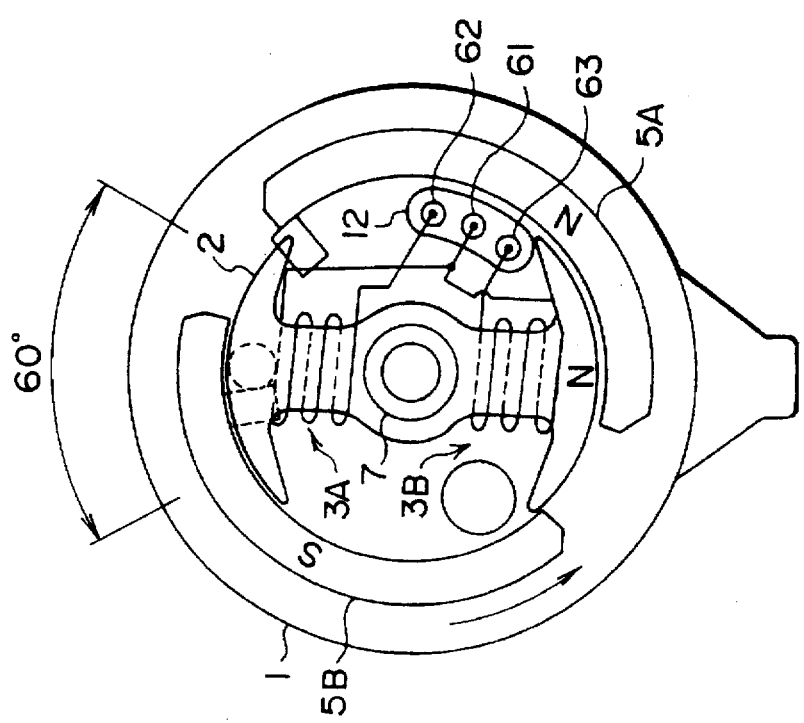

When the switch 51 is switched over from the contact H to the contact S in the state of FIG. 9(B), current flows in the coil 3B in an opposite direction to that of the first embodiment due to the lead 61 and a lead 63, so the end of the core 2 passing through the coil 3A is magnetized as a N pole. As a result, there is a repulsion between this N pole and the N pole on the inner circumference of the magnet 5A, and an attraction between this N pole and the S pole of the inner circumference of the magnet 5B, so the ring rotor 4 rotates clockwise to reach the position of FIG. 9(a). The control rod therefore rotates to a soft damping force setting position.

The same effect is obtained according to the second embodiment as according to the first embodiment.

Next, a third embodiment of this invention will be described with reference to FIGS. 10–16. The housing shown in FIG. 10 is a cylindrical member with a base that houses a stator and rotor of a motor, not shown, and is provided with a clamp 5 that bundles leads together on the rear surface.

The upper end of the housing 1 has an opening 1C, and this opening 1C is sealed by a cover, not shown, after the motor is installed. An effectively circular base 1A is formed at the bottom of the housing 1, this base 1A having an axial hole 6 to allow a motor shaft, not shown, to pass through it.

Figure 10:
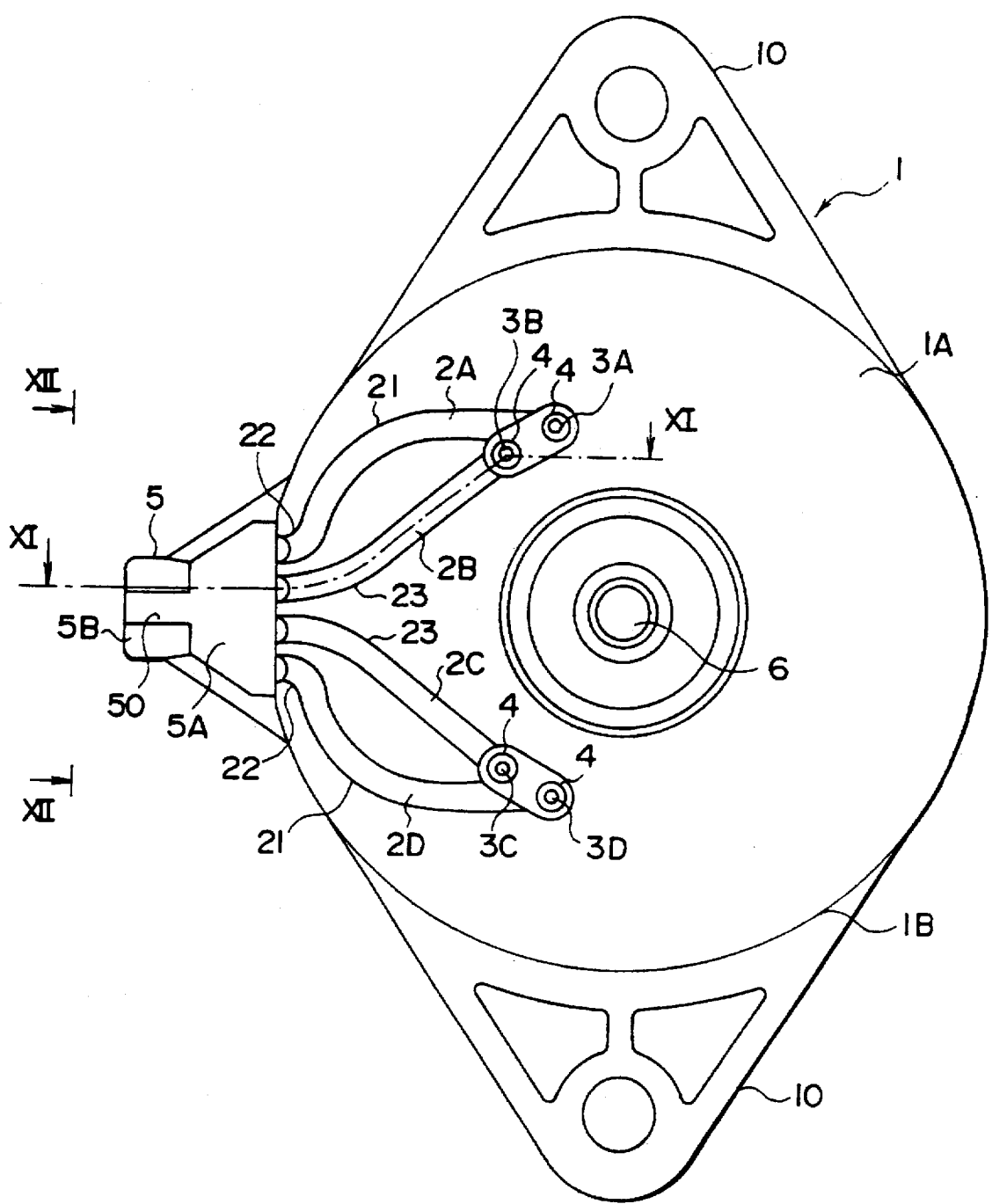
FIG. 10 is a rear view of a housing according to a third embodiment of this invention.

A pair of brackets 10 project at predetermined positions on the side walls 1B of the housing 1 as shown in FIG. 10. The brackets 10 are formed effectively in the same plane as the opening 1C, the clamp 5 being disposed so as to subtend effectively equal angles at these brackets 10.

Figure 13:
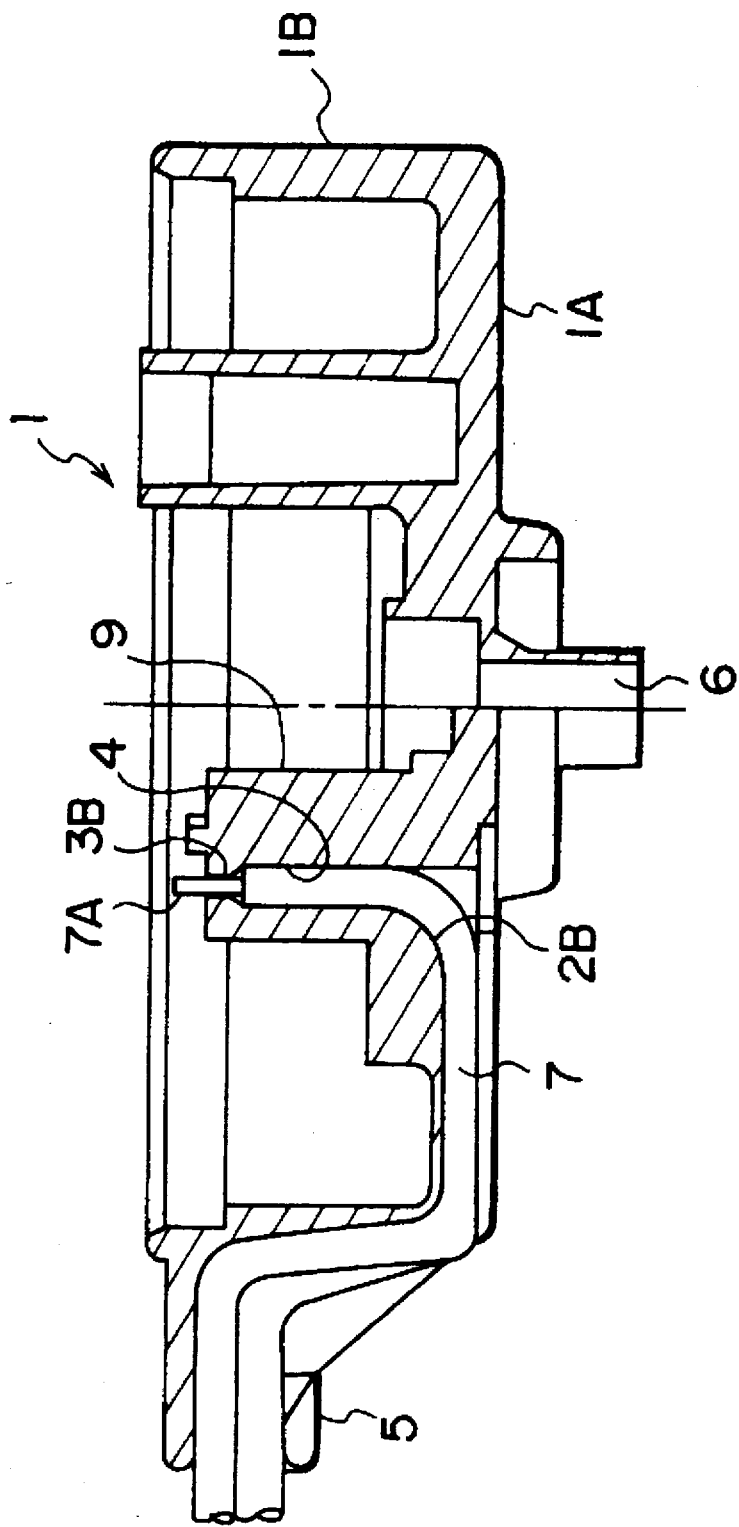
FIG. 13 is similar to FIG. 11, but showing a wiring in place.
Figure 14:
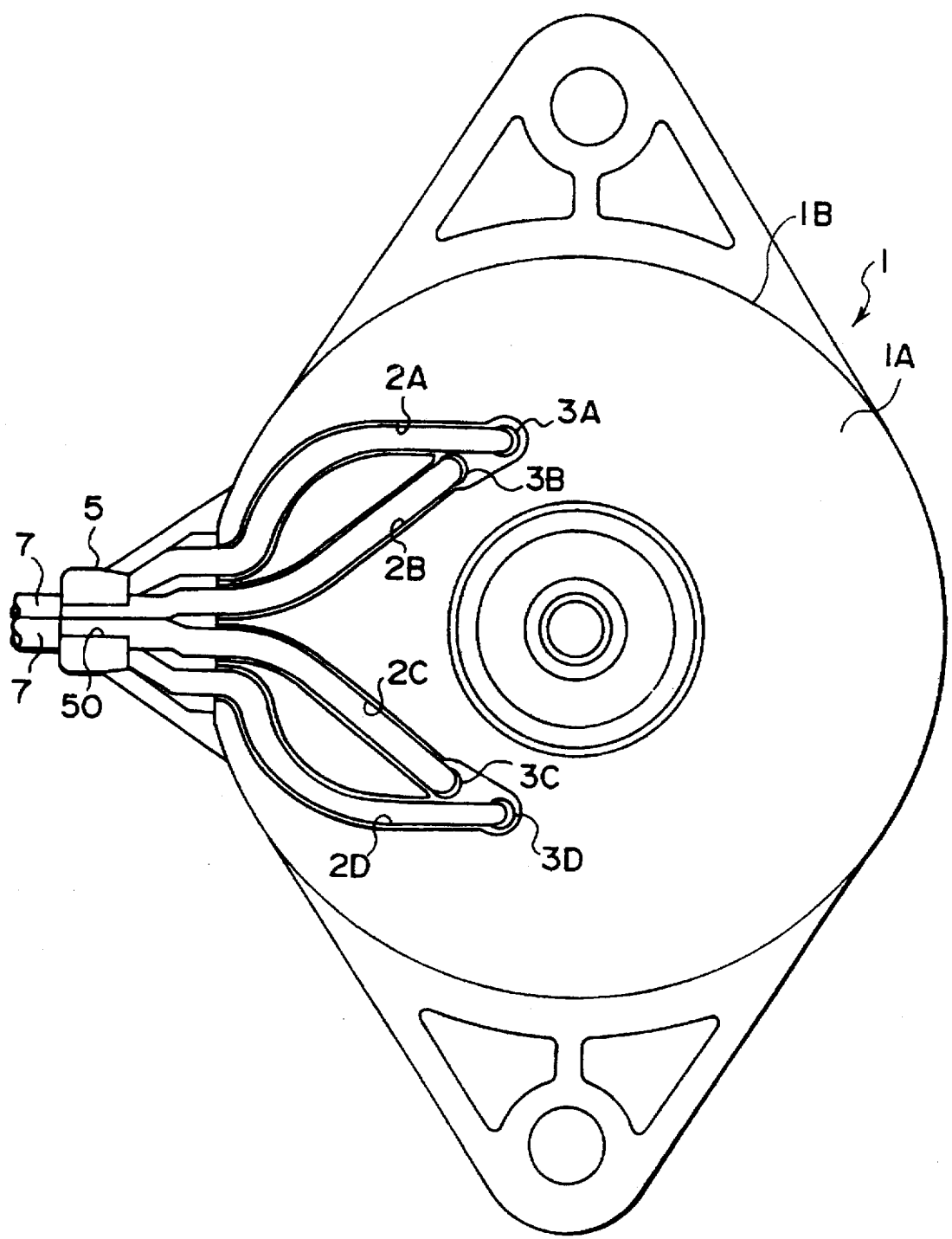
FIG. 14 is similar to FIG. 10, but showing the wiring in place.

A boss 9 projects upwards on the base 1A of the housing 1 as shown in FIG. 2 in order to guide the cord 7 from the clamp 5 to the inside of the housing 1 as shown in FIG. 13. The cord 7 comprises an electrically conducting core covered with a non-electrically conducting sheath.

Throughholes 4 and throughholes 3A–3D are formed in the boss 9 as shown in FIG. 10. The throughholes 3A, 3B and the throughholes 3C, 3D respectively form pairs, and are disposed in symmetrical positions about a center line in the housing 1. All the throughholes are effectively parallel to the shaft axis of the axial hole. The diameters of the throughholes 3A–3D are arranged to be larger than the diameter of a core wire 7A of the cord 7, and smaller than the outer diameter of the sheath of the cord 7.

The throughholes 4 are formed so as to be continuous with the lower parts of the throughholes 3A–3D, and open to the outside of the base 1A. The inner diameters of the throughholes 4 are set to a size that allows the cord 7 to pass through it when sheathed.

Grooves 2A–2D are formed on the outer surface of the base 1A from the openings of the throughholes 4 to the clamp 5. The width and depth of the grooves 2A–2D are set to larger values than the outer diameter of the cord 7.

In FIG. 10, the grooves 2A and 2D that run to the clamp 5 from the throughholes 4 connected with the throughholes 3A, 3D, are first effectively parallel, and after bends 21 that curve towards each other and bends 22 where they are again parallel, they reach the boundary with the side wall 1B of the housing 1.

The grooves 2B and 2C that run to the clamp 5 from the throughholes 4 connected with the throughholes 3B, 3C, are first effectively linear and approach each other at a predetermined angle, then they change direction at bends 23 so that they are parallel, and reach the boundary with the side wall 1B of the housing 1.

The grooves 2A–2D are parallel and equidistant from each other at the boundary.

Figure 11:
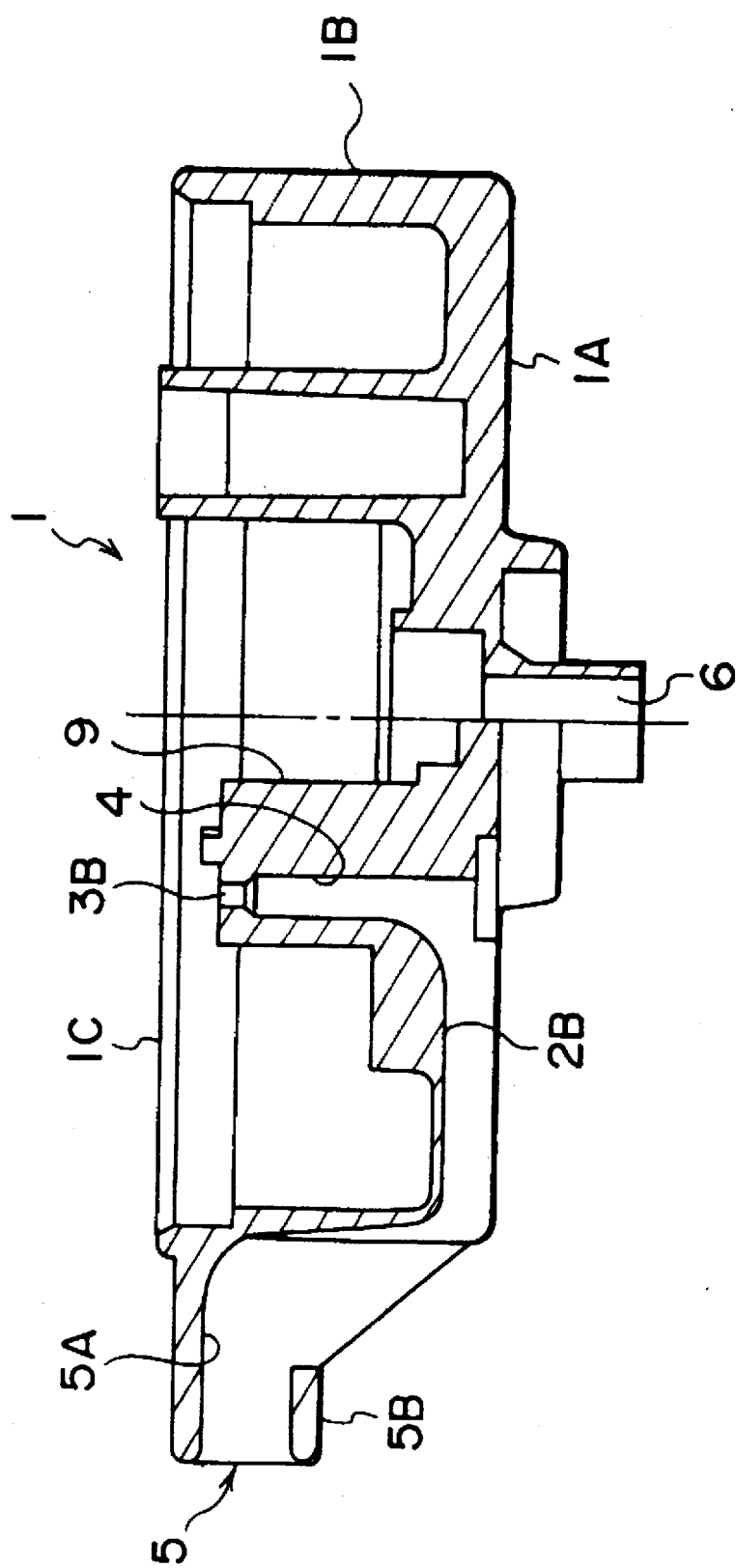
FIG. 11 is a sectional view of the housing taken along a line XI—XI in FIG. 10.
Figure 12:
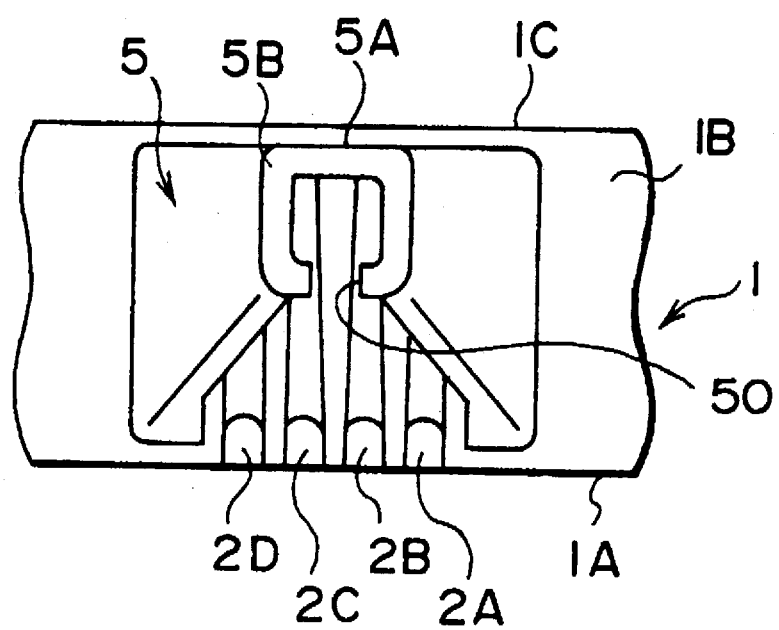
FIG. 12 is a sectional view of the housing taken along a line XII—XII in FIG. 10.

The clamp 5 comprises a roof 5A effectively parallel with the upper edge of the housing 1 forming the opening 1C, and a stop 5B having a notch 50, as shown in FIG. 11.

The grooves 2A–2D first bend toward the roof 5A from the boundary of the base 1A and side wall 1B as shown in FIG. 11, then their depth gradually decreases and finally becomes zero so that they merge with the side wall 1B.

The cord 7 is passed respectively through the throughholes 3A–3D by inserting the core 7A, bared by peeling a predetermined amount of sheath at the end, from the throughholes 4. The tip of the core 7A projects at a predetermined height in the housing 1, and is connected to coils and other circuit components, not shown.

Figure 15:
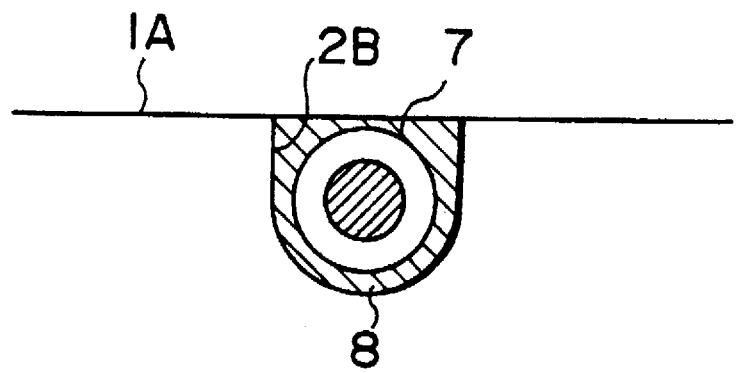
FIG. 15 is a horizontal sectional view of a fixed part of a cord according to the third embodiment.
Figure 16:
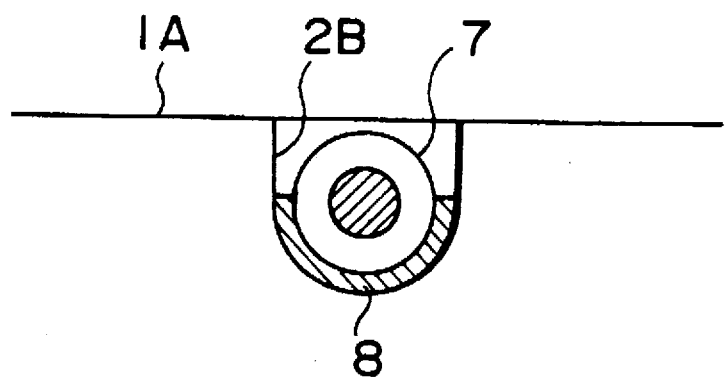
FIG. 16 is similar to FIG. 15, but showing a possible variation.

The cord 7 runs to the clamp 5 from the throughholes 4 via the grooves 2A–2D. After the cord 7 has been wired, the throughholes 4 and grooves 2A–2D are filled with a filler 8 as shown in FIG. 15 so as to fix the cord 7 in the throughholes 4 and grooves 2A–2D. This filler 8 may be a resin or an adhesive.

The cord 7 which is bent effectively at right angles from the base 1A to the side wall 1B, reaches the roof 5A, curves again and projects beyond the stop 5B to the outside. When these cords 7 are fitted to the clamp 5, they are led one at a time from the notch 50 to be embedded inside the stop 5B. In this way, four cords 7 fitted to the clamp 5 are held inside the stop 5B by elasticity of the sheath. The stop 5B is therefore previously formed with dimensions suitable for holding the four cords 7. The four cords 7 projecting from the clamp 5 are connected to connectors, not shown.

The cords 7 are fixed by embedding in the grooves 2A–2D and throughholes 4 by means of the filler 8. As they are led to the side wall 1B via the bends 21–23, the tension acting on the cords 7 when the motor is fitted as in an automobile or the like is supported at the bends 21–23 and also supported in the fixed part by the filler 8. This makes it difficult for the cords 7 to become detached from the base 1A under the effect of external forces, suppresses the transmission of loads due to external forces acting on connections with circuit components inside the housing, and prevents breaks in connection wiring.

As the cords 7 guided from the base 1A to the side wall 1B are first attached to the clamp 5 before continuing to the outside, the clamp 5 has the function of protecting the cords 7 against external forces acting on the housing 1 or cords 7. From a structural viewpoint, therefore, the cords 7 embedded in the base 1A are not easily affected by non-tensile forces such as forces acting to detach the cord from the base 1A, hence it is unlikely that the cords 7 will be damaged by external forces.

The grooves 2A–2D formed continuously from the base 1A to the side wall 1B prevent the cords 7 from sacking out of the housing 1, and the base 1A is effectively smooth. It is therefore easy to position and support the housing 1 when the motor is fitted to a vehicle, and there is greater freedom of choice in deciding an installation position in a limited space. Also, as the cords 7 do not stick out of the housing 1, the motor itself may be made more compact.

When the motor is assembled, and the cords 7 with cores 7A exposed over a predetermined length at their tips are passed through the throughholes 3A–3D from the throughholes 4, the cores 7A having a fixed length project inside the housing 1 from the throughholes 3A–3D. The cores 7A having a preset length therefore project inside the housing 1, soldering of the cores 7A to circuit components, etc. is easy, and assembly operations are rendered more efficient. As the terminals used in the prior art are not necessary, the number of parts can be reduced and manufacturing costs can be lowered. As there is no need for space to house the terminals, it will be understood that this also contributes to making the motor compact.

Instead of having the filler 8 completely fill the grooves 2A–2D, it may also be used to fill only the space between the vicinity of the bases of the grooves 2A–2D and the cords 7.

Figure 17:
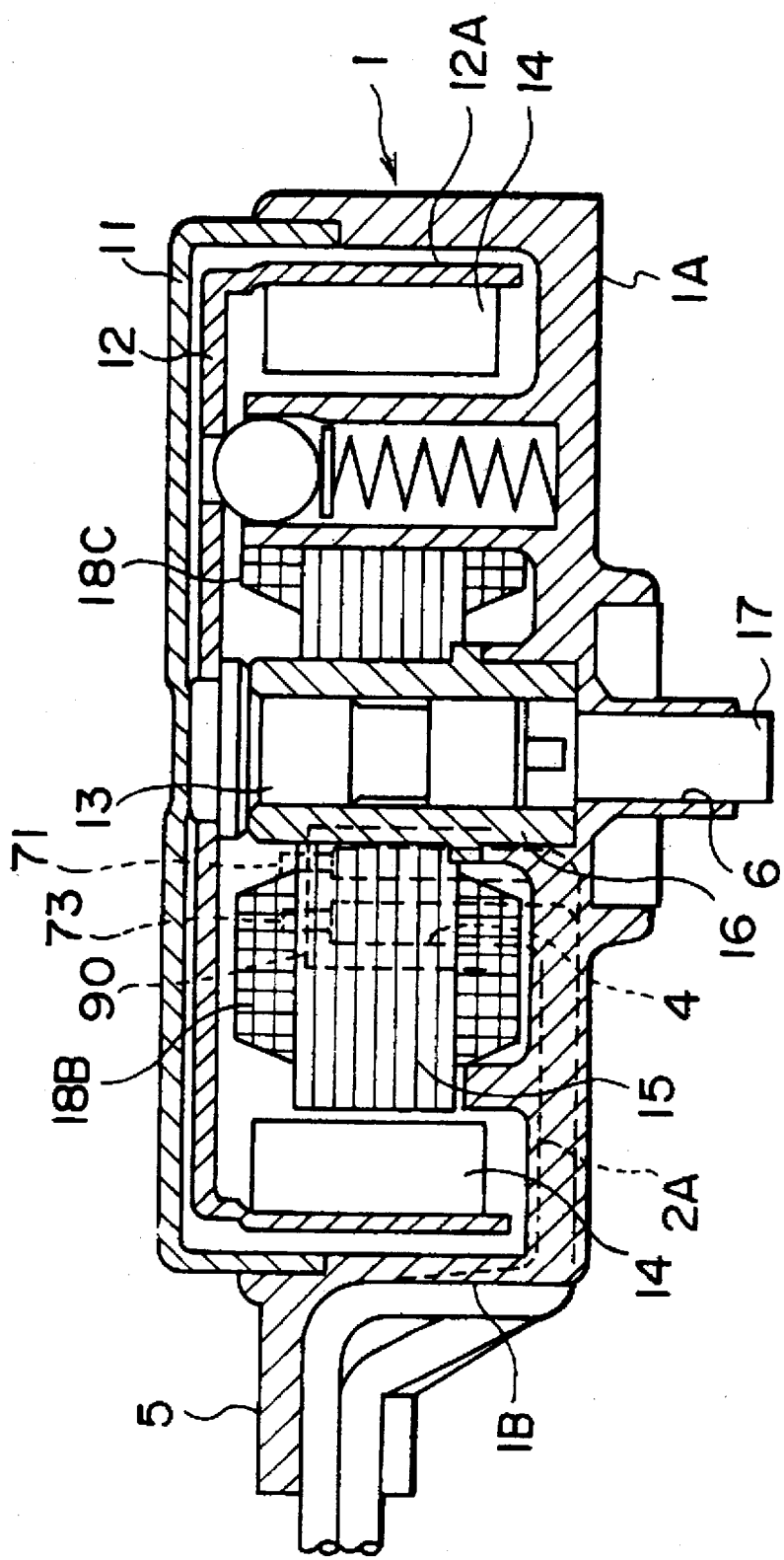
FIG. 17 is a vertical sectional view of a brushless motor according to a fourth embodiment of this invention.
Figure 18:
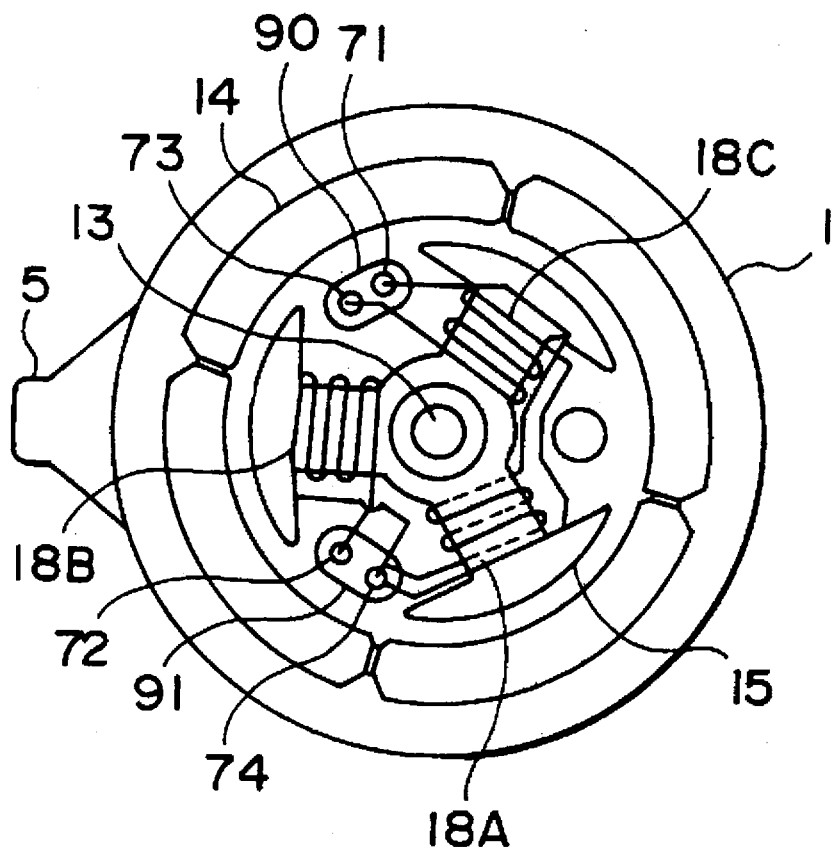
FIG. 18 is a schematic plan view of the brushless motor.

FIGS. 17 and 18 show an example of applying the aforesaid housing to a brushless motor. In this motor, a cylindrical bearing 16 projects inside the housing 1 from an axial hole 6 in the center of the housing 1. A rotor shaft 13 of a ring rotor 12 is supported on the inner circumferential surface of this bearing 16. The ring rotor 12 is housed in the housing 1, and sheathed by a cover 11. The rotor shaft 13 is joined to a load, not shown, via a joint 17 attached to the shaft 13 in the bearing 16.

The ring rotor 12 comprises four magnets 14 having an arc-shaped cross-section fixed on the inner circumference of a cylindrical part 12A so as to form a ring. Three core poles 15 which extend radially at 120° intervals are fixed on the inner surfaces of these magnets 14 in the housing 1 with the bearing 16 as center, and coils 18A–18C are wound on these poles 15.

Bosses 90, 91 project effectively parallel to the rotor shaft 13 from the base 1A into the housing 1. One end of a cord 71 for supplying power to the coil 18A and one end of a cord 73 for supplying power to the coil 18C, are passed through the boss 90. One end of a cord 72 for supplying power to the coil 18B and a cord 74 for earthing the coil 18A–18C, are passed through the boss 91. These cords 71–74 are embedded in the grooves 2A–2D and throughholes 4 via the filler 8, run to the side wall 1B via the bends 21–23, and are led to the outside via the clamp 5 as described hereintofore.

The coils 18A–18C are connected to the cords 71–74 of which the cores project from the bosses 90, 91.

The cords 71–74 are connected to circuit components without any need of joint members such as terminals, so the housing 1 may be made compact and lightweight. The cords 71–74 are supported against axial forces at the bends 21–23, and as the cords 71–74 are fixed by the filler 8, the connections between the cores of the cords 71–74 and the coils 18A–18C are not affected by loads. As a result, broken wires do not easily occur in the connections.

The aforesaid embodiment was described in the case of a motor, however it is not limited to motors and may also be applied to electromagnetic actuators or other electrical devices in general.

The embodiments of this invention in which an exclusive property or privilege is claimed are defined as follows:

1. An electromagnetic actuator, comprising:
   a ring rotor having two magnets of different polarity disposed on an inner circumferential surface of said ring rotor;
   a base means for rotatably supporting the ring rotor;
   two stator coils fixed on said base opposite said magnets on the inner side of said ring rotor;
   switching means for selectively energizing said stator coils;
   means for holding said ring rotor at first and second positions relative to said base means, said means for holding including engagement holes defined in said ring rotor, an engagement member, means for movably supporting said engagement member on said base means to permit movement toward and away from said engagement holes allowing detachable engagement of said engagement member with said engagement holes of said ring rotor when said ring rotor is at said first and second positions respectively, and means for biasing said engagement member towards said ring rotor; and stopper means for limiting rotation of said ring rotor to a range inclusively defined by said first and second positions.

2. An electromagnetic rotary actuator as defined in claim 1, wherein said actuator further comprises a timer interposed in series with said switching means, and which shuts off current to said coils at a predetermined time after energization begins.

3. An electromagnetic actuator comprising:

a ring rotor assembly;

a base means for rotatably supporting said ring rotor assembly;

said base means including a stator assembly;

torque means for producing bi-directional torque on said ring rotor assembly relative to said stator assembly to rotate said ring rotor assembly between first and second positions;

detent means for dententially holding said ring rotor at said first and second positions without force from said torque means and releasing said ring rotor in response to torque applied by said torque means;

said detent means including engagement holes defined in said ring rotor assembly, an engagement member, means for movably supporting said engagement member on said base means to permit movement toward and away from said engagement holes allowing detachable engagement of said engagement member with first and second ones of said engagement holes of said ring rotor assembly when said ring rotor assembly is at said first and second positions respectively, and means for biasing said engagement member towards said ring rotor assembly.

4. An electromagnetic actuator comprising:

a ring rotor assembly;

a base means for rotatably supporting said ring rotor assembly;

said base means including a stator assembly;

torque means for producing bi-directional torque on said ring rotor assembly relative to said stator assembly to rotate said ring rotor assembly between first and second positions;

detent means for dententially holding said ring rotor at said first and second positions without force from said torque means and releasing said ring rotor in response to torque applied by said torque means;

limiting means for limiting rotation of said ring rotor assembly to between said first and second positions; said limiting means including an arcuate groove formed in said stator assembly and a boss formed on said ring rotor assembly engaging said arcuate groove wherein an arc of said arcuate groove defines limits of rotation of said ring rotor assembly.

5. An electromagnetic actuator comprising:

a ring rotor assembly having an armature with at least first and second coils;

a base means including means for rotatably supporting said ring rotor assembly;

said base means including a stator assembly having at least first and second magnets disposed thereon with opposite poles facing said ring rotor assembly;

means for selectively driving said first and second coils to produce bi-directional torque on said ring rotor assembly relative said stator assembly to rotate said ring rotor assembly between first and second positions;

detent means for dententially holding said ring rotor assembly at said first and second positions without force from said torque means and releasing said ring rotor assembly in response to torque applied by said torque means;

said detent means including engagement holes defined in said ring rotor assembly, an engagement member, means for movably supporting said engagement member on said base means to permit movement toward and away from said engagement holes allowing detachable engagement of said engagement member with first and second ones of said engagement holes of said ring rotor assembly when said ring rotor assembly is at said first and second positions respectively, and means for biasing said engagement member towards said ring rotor assembly; and limiting means for limiting rotation of said ring rotor to a range inclusively defined by said first and second positions.

* * * * *